United States Patent [19]

Mitchell et al.

[11] 4,260,642

[45] Apr. 7, 1981

[54] PROCESS FOR MODIFYING STARCH WITH SODIUM OR CALCIUM STEAROYL-2-LACTYLATE

[75] Inventors: William A. Mitchell, Lincoln Park, N.J.; William C. Seidel, Monsey, N.Y.

[73] Assignee: General Foods Corporation, White Plains, N.Y.

[21] Appl. No.: 960,218

[22] Filed: Nov. 13, 1978

[51] Int. Cl.$^3$ .............................................. A23L 1/195
[52] U.S. Cl. ................................... 426/579; 426/656; 426/661; 127/71
[58] Field of Search ............... 426/579, 660, 661, 654, 426/656; 127/71

[56] References Cited

U.S. PATENT DOCUMENTS

| | | | |
|---|---|---|---|
| 3,332,785 | 7/1967 | Kuchinke | 426/579 |
| 3,464,857 | 9/1969 | Marotta | 426/579 |
| 3,539,358 | 11/1970 | Hing | 426/579 |
| 3,582,350 | 1/1971 | Werbin | 426/579 |
| 3,893,842 | 7/1975 | Glabe et al. | 426/661 |
| 3,914,456 | 10/1975 | Norsby et al. | 426/579 |

*Primary Examiner*—Jeanette M. Hunter
*Attorney, Agent, or Firm*—Mitchell D. Bittman

[57] ABSTRACT

This invention involves a process for preparing a pregelatinized modified starch suitable for use in instant puddings which comprise forming an aqueous slurry containing an ungelatinized starch and an effective amount of sodium or calcium stearoyl-2-lactylate, heating the slurry to a temperature and for a period of time sufficient to gelatinize the starch, and recovering the starch. The resultant pregelatinized modified starch possesses a smoother, creamier mouthfeel and has a high sheen.

16 Claims, No Drawings

PROCESS FOR MODIFYING STARCH WITH SODIUM OR CALCIUM STEAROYL-2-LACTYLATE

BACKGROUND

Generally there are two principal ways in which starch can be processed. First, starch can be chemically modified in water or solvents and dried, resulting in whole, individual starch granules. This is the type of starch used in puddings which require cooking. Secondly, if an instant water soluble starch is needed, the starch is pregelatinized by, for example, passing a starch slurry over a drum dryer. The drum dryer simultaneously cooks and dries the starch in cold water swellable sheets. This type of starch is used in instant puddings.

A starch which is modified is one in which physical properties such as viscosity, texture, dispersibility, stability and syneresis are altered. The important chemical means of making these kinds of changes are acid hydrolysis, oxidation, crosslinking esterification and etherification. However, associated with some chemical modifications are undesirable by-products or residues (e.g., clorohydrin residues, etc.). Another suggested means is the creation of an osmotic condition by the addition of various salts to a starch slurry prior to gelatinization in order to inhibit bursting of starch granules by controlling swelling of the granules. However, the resultant starch granules generally do not fully swell and lack uniformity in the degree of gelatinization thus producing a starch which is substantially inferior to the chemically modified starches.

It thus becomes a feature of this invention to provide a process for the modification of starch but without undesirable by-products or residues.

It is a further feature of this invention to produce a physically modified pregelatinized starch having properties of a chemically modified pregelatinized starch.

SUMMARY

Briefly, the process of this invention involves modifying a starch by forming an aqueous slurry containing an ungelatinized starch and an effective amount of sodium or calcium stearoyl-2-lactylate, heating the slurry to a temperature and for a period of time sufficent to gelatinize the starch and drying the starch. The resultant modified starch possesses a smoother, creamier mouthfeel and a higher sheen without a loss of viscosity or body than a starch pregelatinized without sodium or calcium stearoyl-2-lactylate.

DETAILED DESCRIPTION OF THE INVENTION

The process of this invention first involves forming an aqueous slurry containing an ungelatinized starch and sodium stearoyl-2-lactylate (SSL) or calcium stearoyl-2-lactylate (CSL). Depending on the means employed to subsequently heat and dry the starch slurry, the percent solids in the aqueous slurry can vary as is common in the art. Generally, the solids level of the slurry employed when treating the starch is such as to facilitate processing and handling of the slurry. For example, when the means employed is drum drying, the solids levels in the slurry can be up to about 50% by weight, preferably from about 20 to 40% by weight. When the means of heating the slurry is a swept surface heat exchanger, preferably the solids level in the slurry is at most 10%, in order to prevent significant granule breakage during processing and to facilitate pumping and handling of the slurry.

In order to modify the resultant pregelatinized starch, sodium stearoyl-2-lactylate (hereinafter referred to as "SSL") or calcium stearoyl-2-lactylate (hereinafter referred to as "CSL") is employed in the slurry in an amount effective to impart the resultant modified starch with a smoother, creamier mouthfeel and a higher sheen without a loss of viscosity or body than starches processed without SSL or CSL. When drum drying the starch slurry preferably the level of SSL is within the range of about 0.04% to 0.75% by weight of the dry starch and the level of CSL is within the range of about 0.08% to 2.25% by weight of the dry starch. When the starch is to be heated in a swept surface heat exchanger, preferably the level of SSL is within the range of about 0.04% to 1% by weight of the dry starch and the level of CSL is within the range of about 0.08% to 3% by weight of the dry starch. Higher levels of SSL or CSL result in a pregelatinized starch whose agglomerates or granules are too dense and unable to fully swell resulting in a low viscosity, poor mouthfeel and lack of body, and thus the resultant pregelatinized starch would be unsuitable for use in instant puddings.

Various types of ungelatinized starch can be modified by the process of this invention including starches such as tapioca starch, potato starch, corn starch or waxy maize starch, with the preferred starch being tapioca because of its clean taste and minimal flavor masking effects when used in food products, such as instant puddings. While preferably the starch is a raw starch, alternatively the starch can be a chemically modified starch (e.g., starch esters or starch ethers), the criteria being that the starch is ungelatinized.

While the pH of the slurry is not critical to the process of this invention, preferably the pH is within the range of about 4 to 8 to further aid in granule stability. However, extremes in pH are to be avoided as they can be expected to cause chemical reactions when heated.

After forming the slurry of starch and SSL or CSL, the slurry is heated to a temperature and for a period of time sufficient to gelatinize the starch, and then the starch slurry is dried. In one preferred embodiment of this invention, the slurry is heated and dried simultaneously in a drum dryer. The drum drying shatters the starch granules and forms light porous agglomerates which when in solution swell providing a smoother, creamier mouthfeel, a higher gloss and sheen and a less grainy texture without a loss of viscosity or body than a starch processed without SSL or CSL. It is theorized that the SSL or CSL acts to modify the amylose and the amylopectin and prevent it from freely dispersing throughout the pudding system while still obtaining a dry starch capable of rehydration in an instant pudding system.

Drum drying conditions can generally be varied as is known in the art to obtain the best textural, sheeting and drying characteristics. Either a single or a double drum dryer may be employed. Generally the double drum dryer is run under the following conditions: % solids of 15–50%; slurry pH 4 to 6; slurry temperature of 5 to 45° C.; slurry holding time of 0 to 24 hours; drum drier gap of 0.001 to 0.005 cm.; rpm of 0.5 to 7; and steam pressure of 0.7 to 7 kg per sq. cm. The single drum dryer is generally run under the following conditions: % solids of 20 to 45%; slurry pH 5.5 to 6.5; slurry holding time of 0 to 24 hours; steam pressure of 2.8 to 11.3 kg per sq. cm.; applicator roll adjusted to produce minimum sheet thickness and rpm adjusted to attain a moisture content of about 1 to 9%. After the slurry has been drum dried, the dried modified starch can then be ground and screened to a particle size which is appropriate for the intended use of the modified starch. Preferably the starch is ground and screened to a size wherein the particles pass through a 200 mesh U.S. Standard screen.

When the slurry is to be drum dried, the slurry preferably additionally contains an emulsifier or a protein to further enhance the textural and mouthfeel attributes and control the viscosity of the resultant modified starch. Appropriate emulsifiers include polyglycerol mono stearate, mono and diglycerides, glycerol lactyl palmitate, glycerol lactyl oleate, succinylated mono glycerides, sorbitan 40, polyglycerol mono phosphate and phosphated mono glycerides. However, polysorbate 60 and lecithin are the most preferred emulsifiers as when either is used in combination with the sodium or calcium stearoyl-2-lactylate, optimum mouthfeel, sheen, and textural characteristics (glossy surface, smoothness, creaminess) are imparted to the resultant drum dried starch when used in an instant pudding product. For example, when polysorbate 60 is added to the tapioca starch-SSL slurry, it is preferably added at levels between 0.1 to 2% by weight of the dry starch to make the starch more dispersible in solution and provide cohesive forces between starch agglomerates which gives more body to food products employing the starch, such as instant puddings. The slurry may also be drum dried with a protein, such as sodium casienate, soy protein isolate, egg albumin or gelatin in order to impart such optimum characteristics as greater viscosity, mouthfeel and body to the resultant pregelatinized drum dried starch. These characteristics enable a reduction in the amount of starch needed in a pudding formulation, which reduction in turn helps reduce the flavor-masking effects of the starch. Use of the above combinations, or of SSL or CSL alone, results in a non-chemically modified starch which mimics the properties obtained by chemical treatments, such as the properties of the following chemically modified starches: acetylated distarch phosphates, hydroxypropylated distarch phosphates, hyroxypropylated distarch glycerols etc. It is theorized that the SSL or CSL modifies the amylose and amylopectin of the starch resulting in properties similar to cross linking (e.g., shortness, smoothness).

In another preferred embodiment of this invention, the starch can be heated in a conventional heat exchanger such as a swept surface heat exchanger (e.g., a Thermutator TM or a swept surface jacketed kettle), followed by recovering the starch by drying, e.g., air drying, spray drying, vacuum drying, alcohol precipitation, etc. Through the use of SSL or CSL in the above process, significantly more whole starch granules are retained which have been uniformly swelled to the maximum resulting in a high quality modified starch which has a creamier, smoother mouthfeel, a higher sheen and a less mucid and grainy texture than a starch processed without SSL or CSL. The SSL or CSL acts to inhibit granule swelling and bursting, reduce the tendency of the granules to shear and increase the uniformity to which the granules are swelled, thus reducing the amount of overcooked (burst) and undercooked (non-gelatinized) granules. Secondarily, as to any burst granules the SSL or CSL acts to modify the amylose and amylopectin and thus reduces any mucid mouthfeel. These desirable textural attributes are even more pronounced than that obtained in a drum drying process since whole granules are obtained versus agglomerates. It is theorized that these results are attained by the SSL or CSL modifying the amylose and amylopectin of the starch enabling the starch granules to stay in a state of maximum swell for longer periods of time without bursting.

Preferably the slurry is pre-heated to below the gelatinization temperature of the starch prior to employing a swept surface heat exchanger. When the slurry is thus preheated, this further aids in minimizing bursting due to overcooking and the appearance of a large percentage of undercooked and overcooked granules due to uneven heat treatment. The pre-heating results in a more gentle treatment of the starch because the temperature increase is much less, thereby allowing the granules to be swollen to a greater extent. As the number and size of whole granules in the starch are increased, the textural quality of the pudding is improved. When the starch is tapioca starch, preferably the slurry is preheated to about 65° C. to 70° C. and then heated in a swept surface heat exchanger to about 80° C. to 90° C. for a period of time effective to fully gelatinize substantially all of the starch granules. After heating, the slurry is then preferably sent through a cooling cycle to prevent overcooking of any granules, followed by conventional drying.

The modified starches prepared by the process of this invention can be used advantageously in food products, such as instant puddings, which require a pregelatinized starch with a smooth, creamy mouthfeel, having a high gloss and sheen and which is not grainy. These attributes are obtained without chemical modifications of the starch and without the formation of undesirable residues or by-products. A further advantage of the present invention is that the level of modifier (SSL or CSL) employed to prepare the modified pregelatinized starch for use in instant puddings is less than one third the level suggested for use of SSL or CSL as an additive (emulsifier) in a cooked pudding formulation where the starch employed is an ungelatinized starch requiring cooking.

The following examples illustrate various facets of the invention. It should be understood, however, that these examples are meant to be illustrative and the invention is not to be limited thereto.

EXAMPLE I

An aqueous slurry at a temperature of 20° to 25° C. was formed containing ungelatinized tapioca starch at a level of 20% by weight of the slurry, SSL at a level of 0.15% by weight of the dry starch and polysorbate 60 at a level of 0.40% by weight of the dry starch. The slurry was pumped to a double drum dryer where the starch was gelatinized and dried. The drum dryer was operated under the following conditions: steam pressure of 5.8 kg per sq. cm., drum speed of 3 rpm and drum gap of 0.003 cm. The dried modified pregelatinized starch was then ground and screened through a 230 mesh U.S. Standard screen.

The modified starch was then added at a level of 23.5 grams to an instant pudding mix containing approximately 76 grams of sugar, 27 grams of a cocoa blend, 1.5 grams of tetrasodium pyrophosphate, 3 grams of disodium orthophosphate, flavor and color.

Upon reconstituting the pudding mix with 474 ml of milk, a pudding was obtained which had a smooth, creamy mouthfeel and a high gloss and sheen. The textural and flavor attributes were judged to be at parity with an instant pudding prepared using a tapioca starch which had been chemically modified with epichlorohydrin and propylene oxide.

EXAMPLE II

An aqueous slurry at a pH of 6 is formed containing ungelatinized tapioca starch at a level of 7.2% by weight of the slurry, and SSL at a level of 1% by weight of the dry starch. The slurry is preheated to 65° C. and fed into a steam jacketed swept surface-barrel heat exchanger (Thermutator TM) at a rate of about 3.8 liters per minute, with the starch being heated to 88° to 92° for 1 minute, then cooled to about 50° C. The slurry was then diluted to a starch solids content of 3.6% by weight and then fed at a slurry temperature of 68° C. into a spray dryer. The spray drying operating conditions were: nozzle spray pressure of about 35 kg per sq. cm., inlet temperature of 190° to 220° C., and outlet temperature of 100° C.

The modified starch was then added at a level of 25.0 grams to an instant pudding mix containing approximately 76 grams of sugar, 27 grams of a cocoa blend, 4.5 grams of phosphates (tetrasodium pyrophosphate and disodium orthophosphate), flavor and color. Upon reconstituting the pudding mix with 474 ml of milk, a pudding was obtained which had a smooth creamy mouthfeel, and a high gloss and sheen. The textural and flavor attributes were judged to be at parity with an instant pudding prepared using a tapioca starch which had been chemically modified with epichlorohydrin and propylene oxide.

EXAMPLE III

An aqueous slurry was formed containing 250 grams of ungelatinized tapioca starch, 0.1 grams of SSL, 0.7 grams of lecithin and 400 grams of water. The slurry was drum dried on a double drum dryer under the conditions specified in Example I. The dried starch was ground and screened through a 200 mesh U.S. Standard screen. When evaluated in an instant pudding mix, the pudding was judged to be about as smooth but with the same textural qualities as puddings containing a starch chemically modified with epichlorohydrin and propylene oxide.

EXAMPLE IV

An aqueous slurry was formed containing ungelatinized potato starch at a level of 20% by weight of the slurry, SSL at a level of 0.75% by weight of the dry starch and polysorbate 60 at a level of 1.0% by weight of the dry starch. The slurry was drum dried on a double drum drier, then ground and screened under the conditions specified in Example I. When evaluated in an instant pudding mix, the pudding was judged to have a smoother, creamier mouthfeel and a higher sheen without a loss of viscosity or body than a starch pregelatinized without the above modifiers. The resultant modified starch possessed properties which mimicked the properties of chemically modified starches.

EXAMPLE V

An aqueous slurry was formed containing ungelatinized tapioca starch at a level of 20% by weight of the slurry and CSL at a level of 1.0% by weight of the dry starch. The slurry was drum dried on a double drum drier, then ground and screened under the conditions specified in Example I. When evaluated in an instant pudding mix, the resultant pudding was judged to have a smooth, creamy mouthfeel and a high gloss and sheen without a loss of viscosity or body. The resultant modified starch possessed properties which mimicked the properties of chemically modified starches.

What is claimed is:

1. A process for producing a dry pregelatinized starch suitable for use in instant puddings comprising:
   forming an aqueous slurry containing an ungelatinized starch and a modifier chosen from the group consisting of sodium stearoyl-2-lactylate and calcium stearoyl-2-lactylate, the modifier being present at levels effective to uniformly swell the starch granules and minimize bursting and undercooking of the starch granules during gelatinization and to impart the resultant dry pregelatinized starch when rehydrated with a smoother, creamier mouthfeel and a higher sheen without appreciable loss of viscosity or body than a starch pregelatinized without said modifier;
   heating the slurry to a temperature and for a period of time sufficient to gelatinize the starch and to obtain whole starch granules uniformly swelled while minimizing bursting and undercooking of the starch granules; and
   drying the slurry.

2. Process of claim 1 wherein the ungelatinized starch is a chemically modified ungelatinized starch.

3. Process of claim 1 wherein the ungelatinized starch is chosen from the group consisting of tapioca, corn, potato, or waxy maize.

4. Process of claim 3 wherein the starch is a raw starch.

5. Process of claim 1 wherein the slurry is heated in a swept surface heat exchanger to uniformly gelatinize the starch and minimize bursting of the starch granules.

6. Process of claim 5 wherein the level of sodium stearoyl-2-lactylate is within the range of about 0.04% to 1% by weight of the dry starch and the level of calcium stearoyl-2-lactylate is within the range of about 0.08% to 3% by weight of the dry starch.

7. Process of claim 6 further comprising preheating the slurry to a temperature below the gelatinization temperature of the starch prior to heating the starch in the swept surface heat exchanger.

8. Process of claim 7 wherein the starch is tapioca starch, the slurry is preheated to about 65° C. to 70° C. and then heated in a swept surface heat exchanger to about 80° C. to 90° C. for a period of time effective to fully gelatinize substantially all of the starch granules.

9. Process of claim 6 wherein the slurry is dried by alcohol precipitation.

10. Process of claim 6 wherein the slurry is dried by air drying.

11. Process of claim 6 wherein the slurry is dried by vacuum drying.

12. Process of claim 6 wherein the slurry is dried by spray drying.

13. Product produced by the process of claim 1.

14. Product produced by the process of claim 6.

15. In an instant pudding mix, the improvement comprising a dry gelatinized starch prepared by the process of claim 1.

16. In an instant pudding mix, the improvement comprising a dry pregelatinized starch prepared by the process of claim 6.

* * * * *